(12) United States Patent
Huang et al.

(10) Patent No.: US 8,120,575 B2
(45) Date of Patent: Feb. 21, 2012

(54) INTERACTIVE POINTING DEVICE

(75) Inventors: Shih-Ching Huang, Kaohsiung County (TW); Ying-Ko Lu, Taoyuan County (TW); Chin-Lin Hsieh, Taipei County (TW); Shun-Nan Liou, Kaohsiung (TW); Ming-Jye Tsai, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 1089 days.

(21) Appl. No.: 11/934,993

(22) Filed: Nov. 5, 2007

(65) Prior Publication Data

US 2009/0058799 A1 Mar. 5, 2009

(30) Foreign Application Priority Data

Aug. 28, 2007 (TW) ............... 96131767 A (51) Int. Cl.
 *G09G 5/00* (2006.01)
(52) U.S. Cl. ......... 345/156; 345/157; 345/158; 345/159
(58) Field of Classification Search ........... 345/156–159
See application file for complete search history.

(56) References Cited

U.S. PATENT DOCUMENTS

| | | | |
|---|---|---|---|
| 5,440,326 A | | 8/1995 | Quinn |
| 5,825,350 A | | 10/1998 | Case, Jr. et al. |
| 5,898,421 A | | 4/1999 | Quinn |
| 6,342,878 B1 * | | 1/2002 | Chevassus et al. ............ 345/158 |
| 7,158,118 B2 | | 1/2007 | Liberty |
| 2005/0243061 A1 | | 11/2005 | Liberty et al. |
| 2005/0253806 A1 | | 11/2005 | Liberty et al. |
| 2006/0007115 A1 | | 1/2006 | Furuhashi et al. |
| 2006/0028446 A1 | | 2/2006 | Liberty et al. |
| 2007/0139377 A1 * | | 6/2007 | Chiang et al. ................. 345/163 |
| 2007/0176896 A1 * | | 8/2007 | Gritton et al. ................. 345/157 |

FOREIGN PATENT DOCUMENTS

| | | |
|---|---|---|
| CN | 1601447 | 3/2005 |
| JP | 03-192423 | 8/1991 |
| JP | 2006-119893 | 11/2006 |
| TW | 313840 | 6/2007 |
| TW | 316440 | 8/2007 |

OTHER PUBLICATIONS

JP patent application Office Action, Oct. 4, 2011.
Taiwan Intellectual Property Office "Office Action" Sep. 28, 2010, Taiwan R.O.C.

* cited by examiner

*Primary Examiner* — Richard Hjerpe
*Assistant Examiner* — Leonid Shapiro
(74) *Attorney, Agent, or Firm* — WPAT., P.C.; Justin King (57) ABSTRACT

An interactive pointing device having pointing function in space and game control is provided in the present invention. The interactive pointing device comprises an accelerometer module and a gyroscope device. The accelerometer module functions as sensing the movement of the operator and generates at least one axis of accelerating signal corresponding to the sensed movement. The gyroscope device disposed on a turning mechanism functions as sensing rotation status of the interactive pointing device about at least one axis and generate a corresponding rotating signal. The turning mechanism can be operated to adjust the axis of the gyroscope device so that the gyroscope device is capable of sensing rotation status about different axes. The at least one accelerating signal and the rotating signal are then processed for controlling cursor movement of the electrical device and interacting with multimedia gaming programs.

10 Claims, 8 Drawing Sheets

INTERACTIVE POINTING DEVICE

FIELD OF THE INVENTION

The present invention relates to a control device, and more particularly, to an interactive pointing device capable of responding to requirements of an application to dynamically changing the sensing axis of a gyroscope device configured therein.

BACKGROUND OF THE INVENTION

Currently, there are many kinds of computer mouse available on the market, which are the most popular human-machine interface used by computers as cursor-control device. There are three basic types of mice, which are mechanical mouse, LED optical mouse and laser mouse with respect to the different means of detection. A typical mechanical mouse comprises a chassis containing a ball, with a part of the ball protruding through the underside of the chassis. When a user moves the mouse about on a flat surface, the ball rotates which is detected by the sensors arranged in the chassis. Unfortunately the moving parts of such a mouse can become dirty, causing the sensors to incorrectly measure ball rotation. A typical LED optical mouse has a small, red light-emitting diode (LED) that bounces light off that surface with sufficient roughness onto a complimentary metal-oxide semiconductor (CMOS) sensor. The CMOS sensor sends each image to a digital signal processor (DSP) for analysis, that the DSP is able to detect patterns of shadows generated by the roughness of the surface in the images and see how those patterns have moved since the previous image. Based on the change in patterns over a sequence of images, the DSP determines how far the mouse has moved and sends the corresponding coordinates to the computer. However, if the working surface of the LED optical mouse is a smooth surface made of marble, tile, or metal, etc., such mouse might not be able to operate without a hitch. A laser mouse is an advanced optical mouse, which is capable of emitting a coherent light so as to detect more surface pattern variation than the standard LED based optical mice. Nevertheless, such laser mice are not able to operate fluently while working on a transparent surface made of glass, acrylic, and so on.

Since most conventional computer mice are disadvantageous as stated above, it is popular to have an inertial sensing module embedded inside a pointing device for using the inertial sensing module to detect and measure movements of the pointing device operating while sitting on a flat surface or being held in a free space. One such research is a pointing device disclosed in U.S. Pat. No. 5,825,350, entitled "Electronic Pointing Apparatus and Method". The foregoing pointing apparatus is capable of controlling cursor movement and selecting elements on a computer screen no matter it is being held to move on a surface or in a free space by selectively enabling the pointing device to operate in a mode of two-dimensional detection or in a mode of three-dimensional detection, in which two gyroscopic elements are provided for indicating yaw and pitch movements of the pointing apparatus in free space, and a mouse ball and relating mouse ball encoders are provided for indicating movement of the pointing apparatus on a surface.

In recent years, more and more consumer electronic products have gyroscopic elements embedded therein as motion sensors. One such application is a free space pointing device disclosed in U.S. Pub. No. 2005/0253806, entitled "Free Space Pointing Devices and Methods". The aforesaid space pointing device, configured with a first rotational sensor, a second rotational sensor, and an accelerometer, is capable of using a micro processing unit to modify the first and second rotational outputs based on the acceleration, respectively detected by the first rotational sensor, the second rotational sensor and an accelerometer, so as to generate an output based on said modified first and second rotational outputs.

However, those pointing devices disclosed in prior arts are designed simply to communicate with corresponding computation apparatuses, but they fall short of acting as an interface control device to interact with multimedia gaming programs. Therefore, an interactive pointing device integrating a conventional pointing device and interactive game control interface is needed for facilitating users to control computation apparatuses and interact with multimedia gaming programs.

SUMMARY OF THE INVENTION

The object of the present invention is to provide an interactive pointing device capable of responding to requirements of an application to adjust the sensing axis of a gyroscope device configured therein for improving the sensing flexibility of such gyroscope device.

It is another object of the invention to provide an interactive pointing device having pointing function in space and game control, in which rotation status of the interactive pointing device is sensed by a gyroscope device and used as basis for controlling cursor movements and for enabling interactions between a multimedia platform and the interactive pointing device, improving action evaluation precision.

In an exemplary embodiment of the invention, an interactive pointing device is provided, which comprises: an accelerometer module, for generating at least one axis of accelerating signal; a dual-axis gyroscope device, for sensing a rotation movement of the interactive pointing device and generating a corresponding rotating signal; and a micro processing unit, coupled to the accelerometer module and the dual-axis gyroscope device for processing the at least one axis of accelerating signal and the rotating signal so as to interact with an electronic device accordingly; wherein the micro processing unit is able to use the rotating signal to compensate the accelerating signal and assist an action evaluation process of the interactive pointing device operating under different operation modes.

In another exemplary embodiment of the invention, an interactive pointing device is provided, which comprises: an accelerometer module, for generating at least one axis of accelerating signal; a gyroscope device, for sensing a rotation movement of the interactive pointing device and generating a corresponding rotating signal; a turning mechanism, coupled to the gyroscope device for adjusting the orientation of the gyroscope device and generating a turning signal according to the orientation adjustment; and a micro processing unit, coupled to the accelerometer module, the turning mechanism and the gyroscope device for processing the at least one axis of accelerating signal, the turning signal and the rotating signal so as to interact with an electronic device accordingly; wherein the micro processing unit is able to use the rotating signal to compensate the accelerating signal and assist an action evaluation process, of the interactive pointing device operating under different operation modes.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
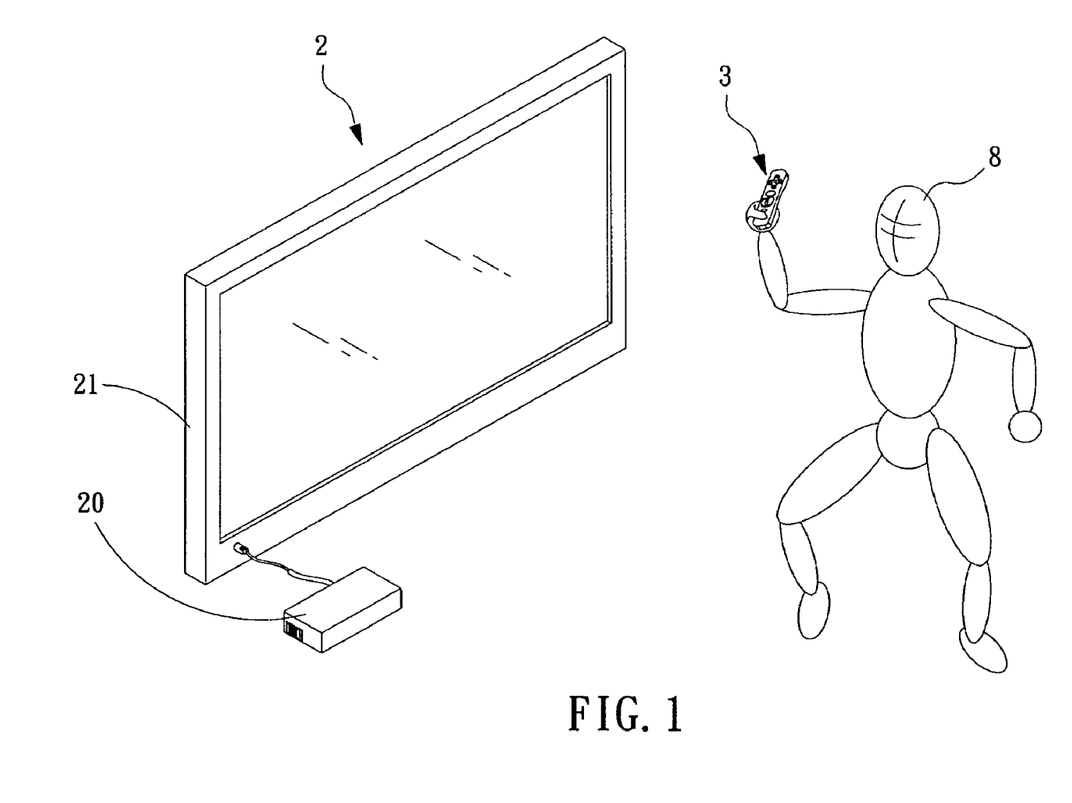
FIG. 1 shows an interactive system utilizing an interactive pointing device according to an embodiment of the invention.

Please refer to FIG. 1, which shows an interactive system utilizing an interactive pointing device according to an embodiment of the invention. The interactive system 2 includes a multimedia console 20, a display device 21 and an interactive pointing device 3, in that a user 8 can use the interactive pointing device 3 to interact with a multimedia program executing in the multimedia console 20. the multimedia console 20 can be a computer or a gaming device with computation ability. In an exemplary embodiment, when the user 8 is interacting with the multimedia console 20, the interaction will be displayed on the display device 21, by which the fun of playing the multimedia games is increased.

Figure 2:
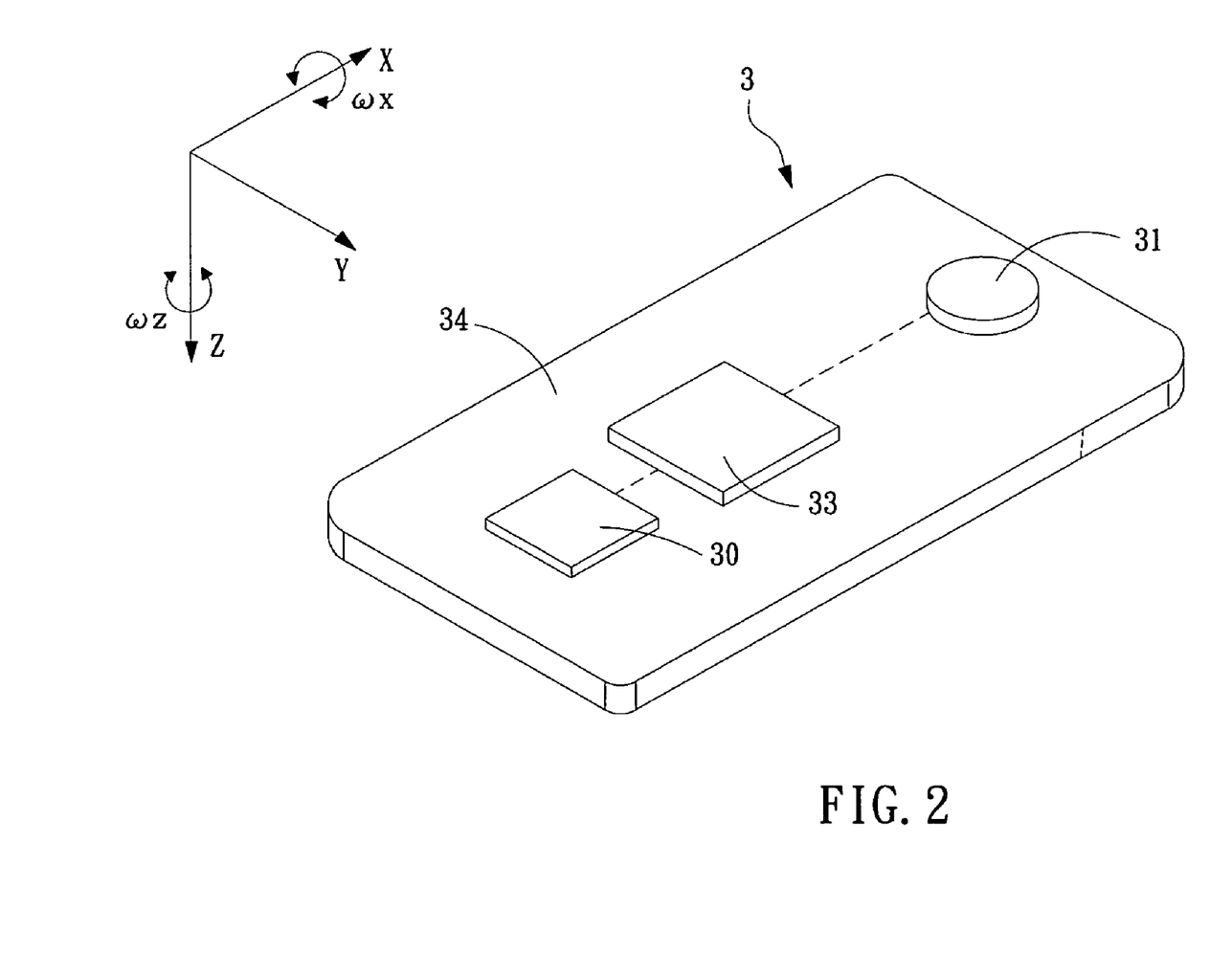
FIG. 2 is a schematic view of an interactive pointing device according to a first embodiment of the invention.

Please refer to FIG. 2, which is a schematic view of an interactive pointing device according to a first embodiment of the invention. In FIG. 2, the interactive pointing device 3 is configured with a circuit board 34, which has an accelerometer module 30, a gyroscope device 31 and a micro processing unit 33 arranged thereon. The accelerometer module 30 is used for sensing a movement of a user operating the interactive pointing device 3 and generates at least one axis of accelerating signal corresponding to the sensed movement. In this embodiment, the accelerometer module 30 is a tri-axis accelerometer module, which substantially can be a module comprised of three independent accelerometers, or an integrated module with ability to detect accelerations of three different axes. On the other hand, the accelerometer module 30 can be a single-axis or dual-axis accelerometer module, or can be an accelerometer module with space and planar sensing abilities.

The gyroscope device 31 is used for sensing a rotation movement of the interactive pointing device 3 and generating a corresponding rotating signal. The gyroscope device 31 can be a single-axis gyroscope device or a dual-axis gyroscope device, In the embodiment shown in FIG. 2, the gyroscope device 31 is a dual-axis gyroscope device capable of sensing angular velocities about the X-axis and Z-axis of a free space defined by a set of orthogonal X-, Y-, and Z-axis while generating rotating signals accordingly. The micro processing unit 33 is coupled to the accelerometer module 30 and the dual-axis gyroscope device 31 for processing the at least one axis of accelerating signal and the rotating signal so as to interact with an electronic device accordingly. It is noted that the electronic device is a device selected from the group consisting of a computer, and an interactive multimedia apparatus. Moreover, the micro processing unit 33 is able to use the rotating signal to compensate the accelerating signal and assist an action evaluation process of the interactive pointing device operating under different operation modes.

The detail of how the micro processing unit 33 is able to use the rotating signal to compensate the accelerating signal and assist an action evaluation process of the interactive pointing device operating under different operation modes is described hereinafter. When the interactive pointing device 3 is operating under a pointing mode, such as it is used for control movements of a cursor displayed on the display device 21 or movement of a character of an interactive game, the micro processing unit 33 uses an acceleration detected by accelerometer module 30 and the rotation status detected by the gyroscope device 31, caused by the movement of the interactive pointing device 3, for controlling the cursor or the character to move horizontally and vertically on the display device 21 accordingly. For instance, under the condition that the interactive pointing device 3 is operating under the pointing mode and signals detected by a Z-axis gyroscope device is applied as control signals for controlling horizontal movements, the rotation of a user's hand holding the interactive pointing device 3 will cause a centripetal acceleration about the X-axis, which is going to cause the cursor or character is jiggle on the display device 21 so that the micro processing unit 33 is configured to compensate the centripetal acceleration caused by the involuntary rotation movement of the interactive pointing device 3 and thus smoothing the cursor control.

Figure 3:
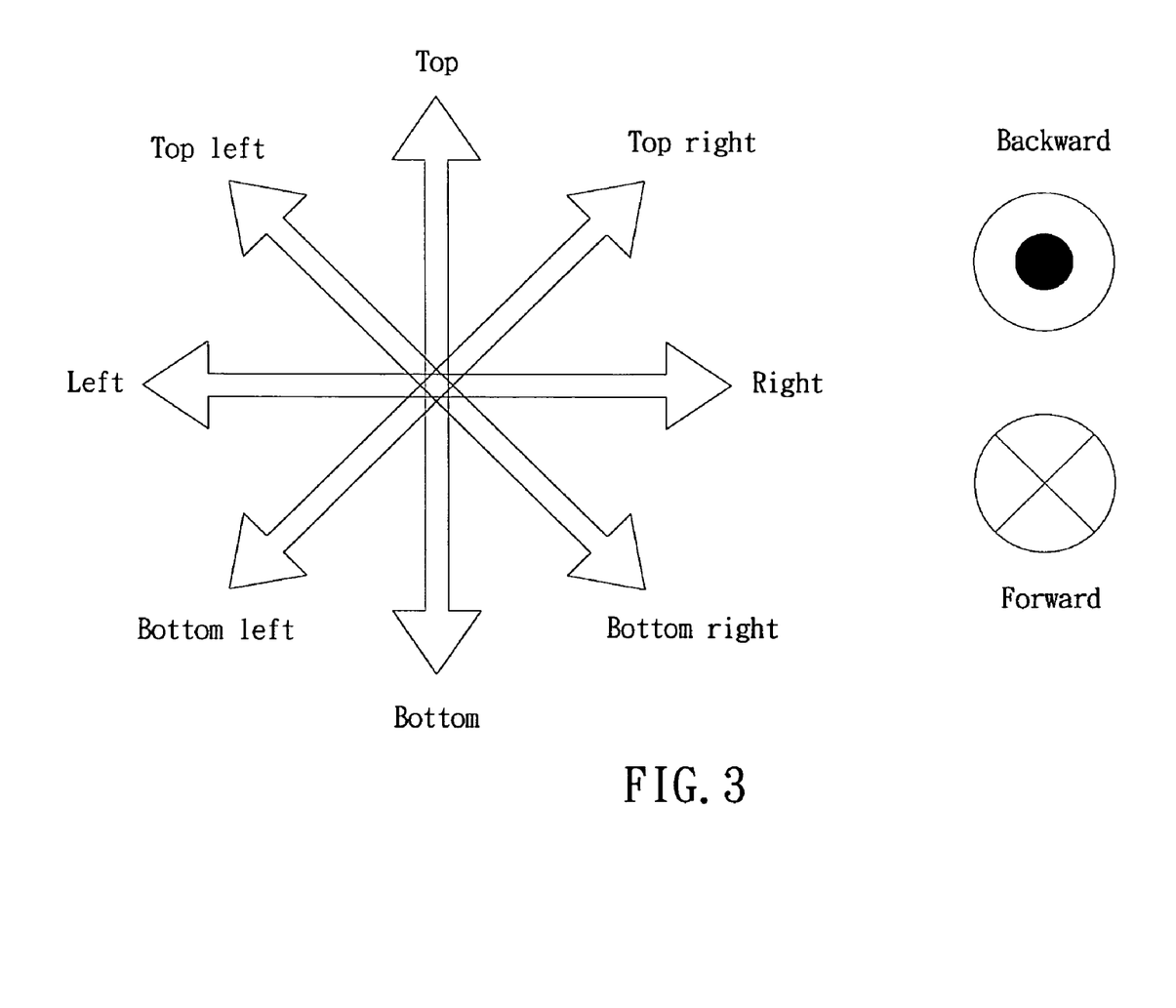
FIG. 3 is a schematic diagram depicting a method of star-eighty-shaped motion control.
Figure 4:
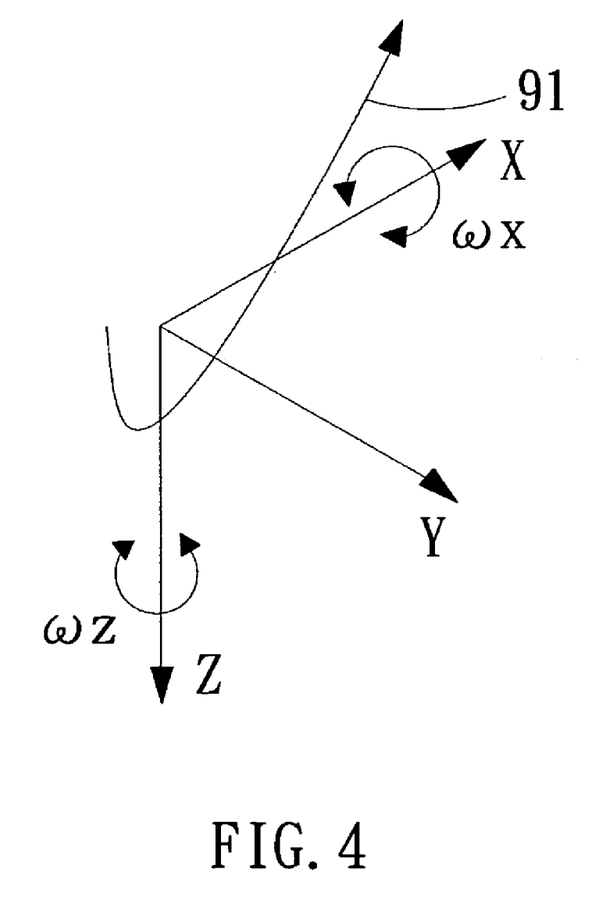
FIG. 4 is a schematic diagram showing control movements of a user operating an interactive pointing device of the invention.

Moreover, when the interactive pointing device 3 is operating under a game control mode and used for interacting with an electronic device, the signals detected by the accelerometer module 30 and the gyroscope device 31 are used as basis for enabling a star-eighty-shaped motion control and thus improving movement evaluation precision comparing with a movement evaluation based simply upon the accelerating signal of the accelerometer module. Please refer to FIG. 3, which is a schematic diagram depicting a method of star-eighty-shaped motion control. The star-eighty-shaped motion control includes directions of top, bottom, left, right, top-left, top-right, bottom-left, bottom-right, forward and backward. That is, the star-eighty-shaped motion control enables a user to use the interactive pointing device 3 to control the character to interact in all those directions shown in FIG. 3. Generally, when a user performs the star-eighty-shaped motion control for controlling the character to interact in the directions of top-left, bottom-left, top-right, and bottom-right, the hand holding the interactive pointing device 3 will rotate involuntarily about an axial direction, i.e. the X-axis, as the control movement 91 shown in FIG. 4, which is going to cause an angular velocity $\omega_x$ to be measured by the gyroscope device 31 and thus generate a rotating signal about the X-axis in addition to the accelerating signal of the accelerometer module 30. Thereafter, the micro processing unit 33 uses the rotating signal and the accelerating signal, transmitted from an A/D converter, to perform an calculation of action evaluation algorithm with respect to the characteristic values captured in the rotating signal and the accelerating signal for improving action evaluation precision comparing with an action evaluation based simply upon the accelerating signal of the accelerometer module 30.

Figure 5A:
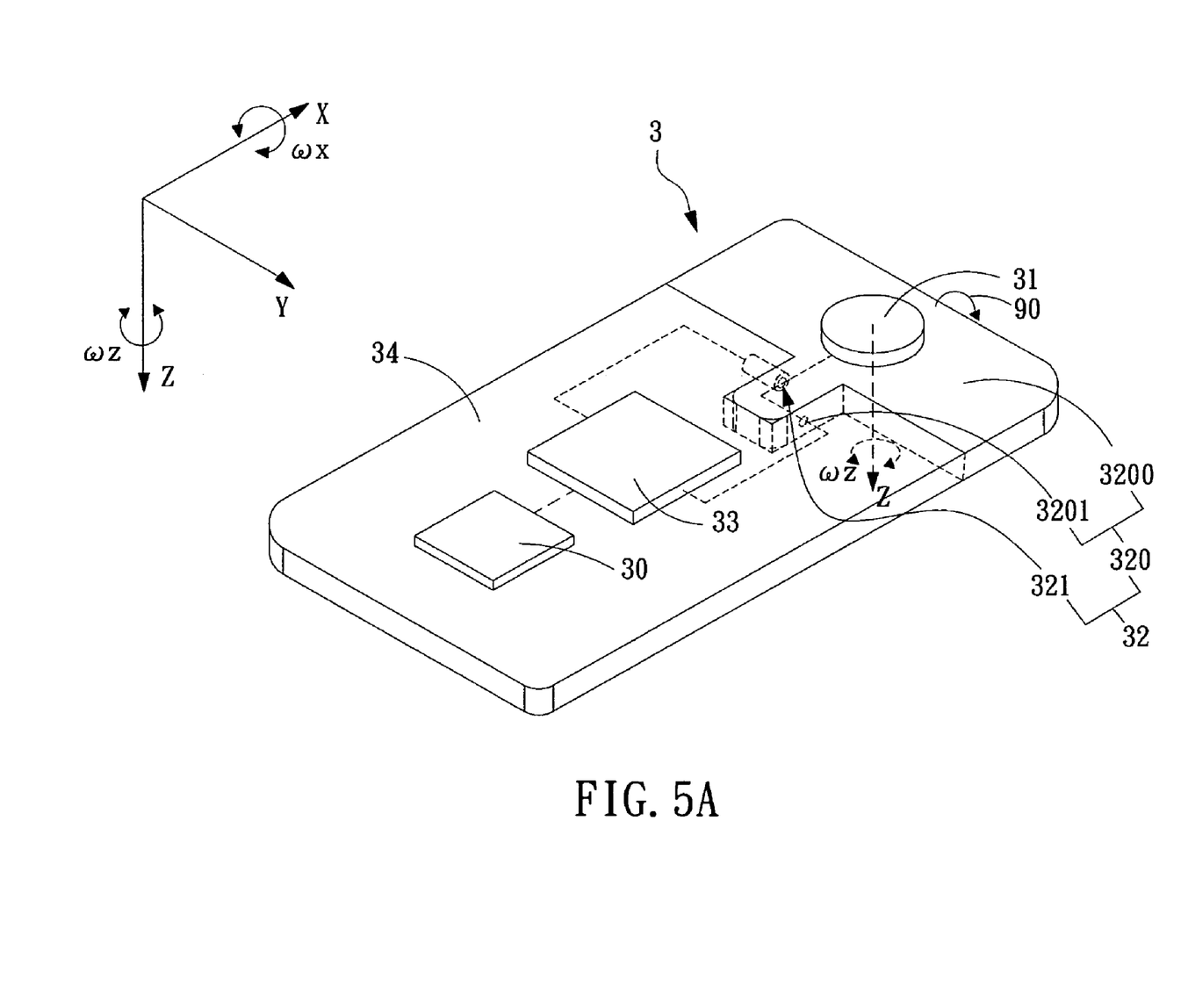
FIG. 5A is a schematic view of an interactive pointing device according to a second embodiment of the invention.

Please refer to FIG. 5A, which is a schematic view of an interactive pointing device according to a second embodiment of the invention. In this embodiment, the interactive pointing device 3 is structured similar to that shown in FIG. 2, but is configured with an additional turning mechanism 32 for adjusting the sensing axis of the gyroscope device 31. In FIG. 5A, the gyroscope device 31 is a single-axis gyroscope device which is coupled to the turning mechanism 32 in a manner that the turning mechanism 32 is able to adjust the orientation of the gyroscope device 31 and thus generate a turning signal according to the orientation adjustment. The micro processing unit 33, coupled to the accelerometer module 30, the turning mechanism 32 and the gyroscope device 31, is used for processing the at least one axis of accelerating signal, the turning signal and the rotating signal so as to interact with an electronic device accordingly.

The turning mechanism 32 is further comprised of a turning unit 320 and a switch mechanism 321. The turning unit 320 is capable of performing a rotation movement for adjusting a sensing axis of the gyroscope device 31; and the switch mechanism, used for informing the turning of the turning unit 320 to the micro processing unit 33, is capable of being activated by the rotation movement of the turning unit 320 and being trigged to generate the turning signal for informing the micro processing unit 33 with the current position of the gyroscope device 31 as soon as the activated switch mechanism 321 reaches a specific position, referring as a first position. Moreover, as soon as the turning unit 320 activates the switch mechanism 321 to reach another specific position, referring as a second position, the turning signal is terminated for informing the micro processing unit that the gyroscope device 31 had been located at another sensing position comparing with that of the first position. In detail, the turning unit 320 is configured with a base 3200 and a pivotal shaft 3201. The base 3200 is used for carrying the gyroscope device 31, and the pivotal shaft 3201 is arranged passing through the base 3200 for enabling the base 3200 to rotate about the pivotal shaft 3201.

Figure 5B:
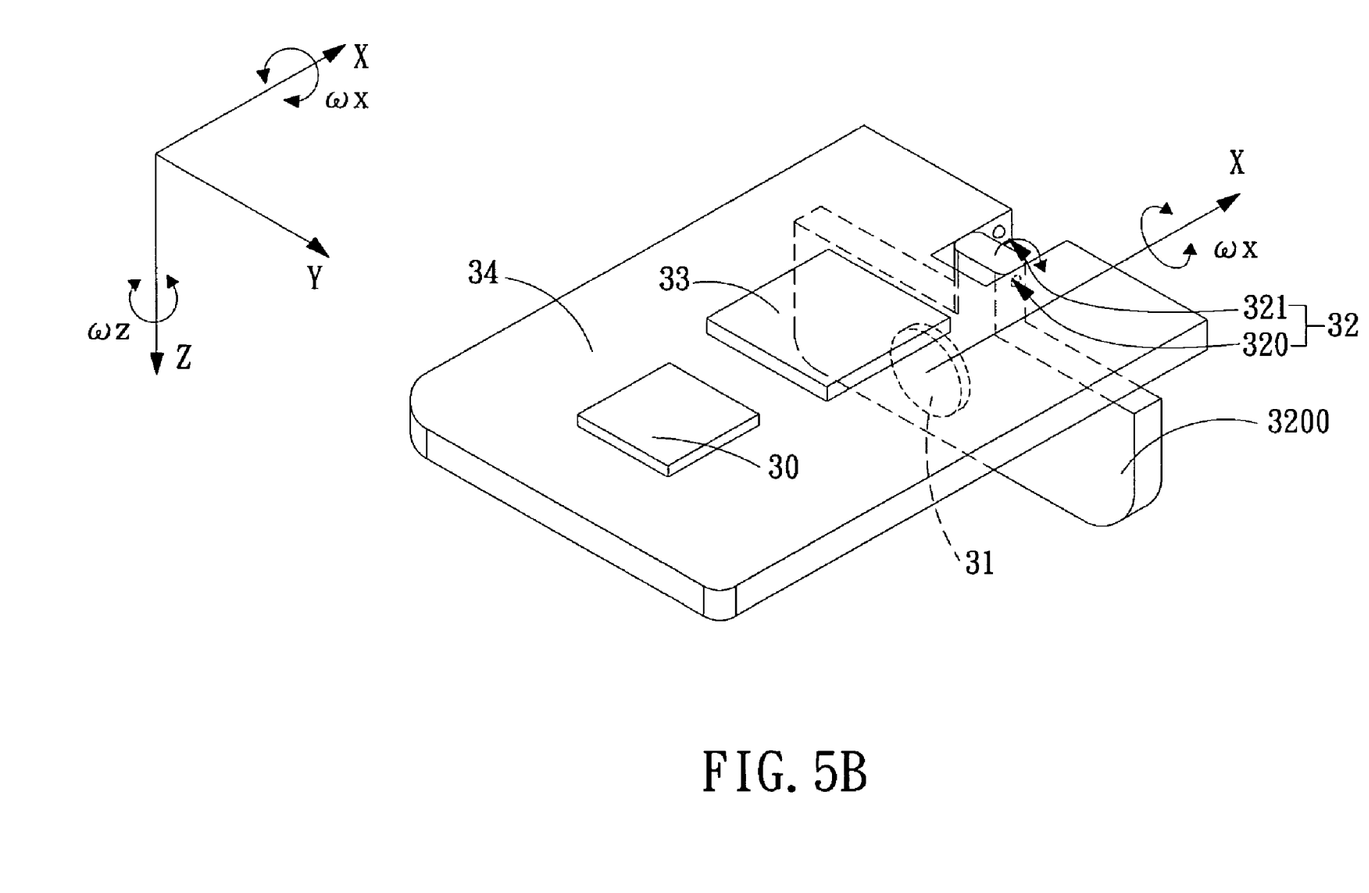
FIG. 5B shows how the sensing axis of gyroscope device in the interactive pointing device is changed by the adjustment of the turning mechanism.

Please refer to FIG. 5B, which shows how the sensing axis of the gyroscope device in the interactive pointing device is changed by the adjustment of the turning mechanism. Operationally, when the base 3200 is arranged at the first position, the gyroscope device 31 is positioned for enabling the same to detect the rotation status of the interactive pointing device 3 about the Z-axis. When a user forces the base 3200 to perform a rotation 90, the base 3200 will rotate 90-degree about the pivotal shaft to 3201 to be positioned at the second position so that the gyroscope device 31 is enabled to detect the rotation status of the interactive pointing device 3 about the X-axis. By the aforesaid structure, the orientation of the gyroscope device 31 can be adjusted by the turning mechanism 32 for changing the its sensing axis according to actual requirements, so that the application multiplicity of the interactive pointing device 3 is enhanced.

Figure 6A:
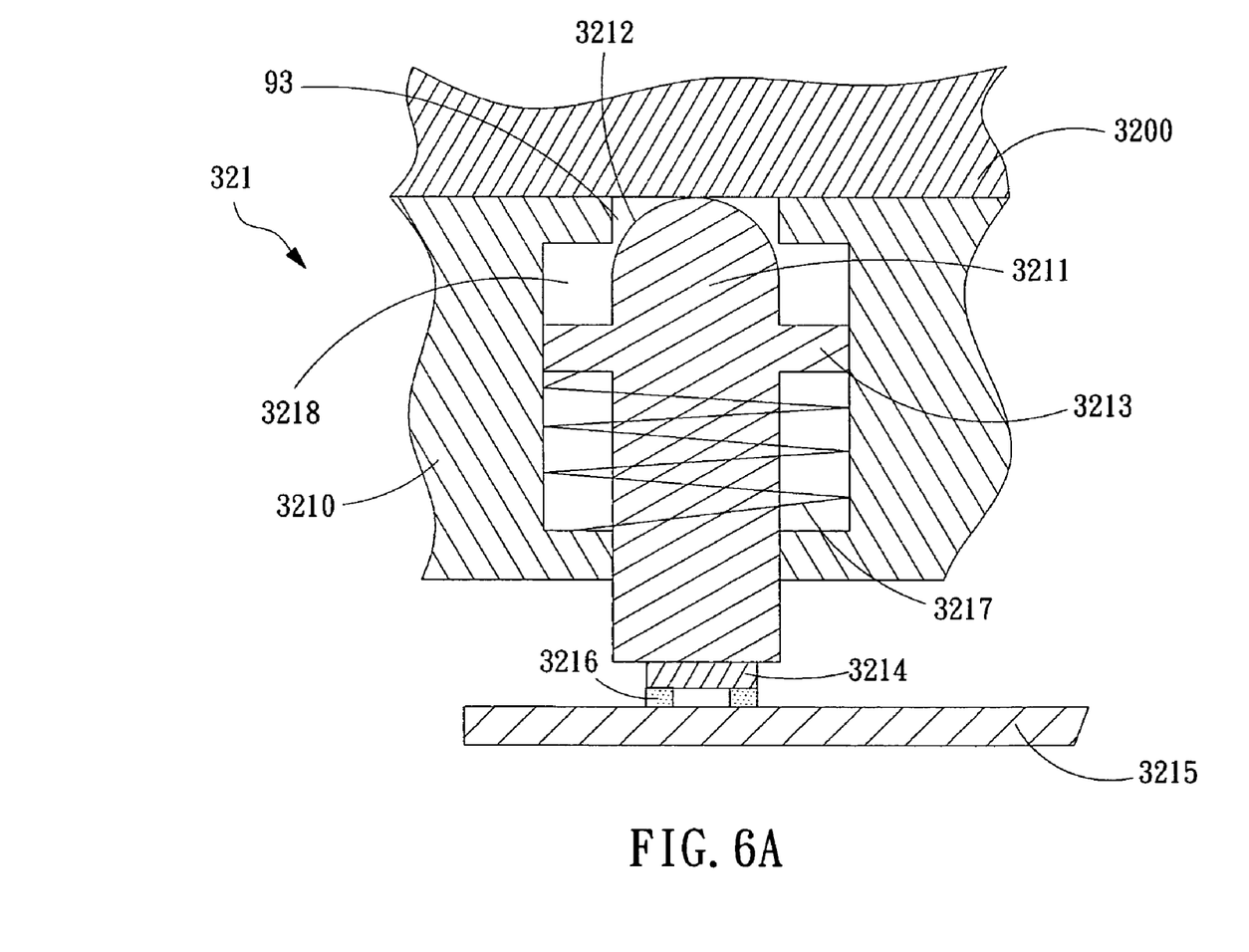
FIG. 6A and FIG. 6B are schematic diagrams showing operations of a switch mechanism used in an interactive pointing device according to an exemplary embodiment of the invention.
Figure 6B:
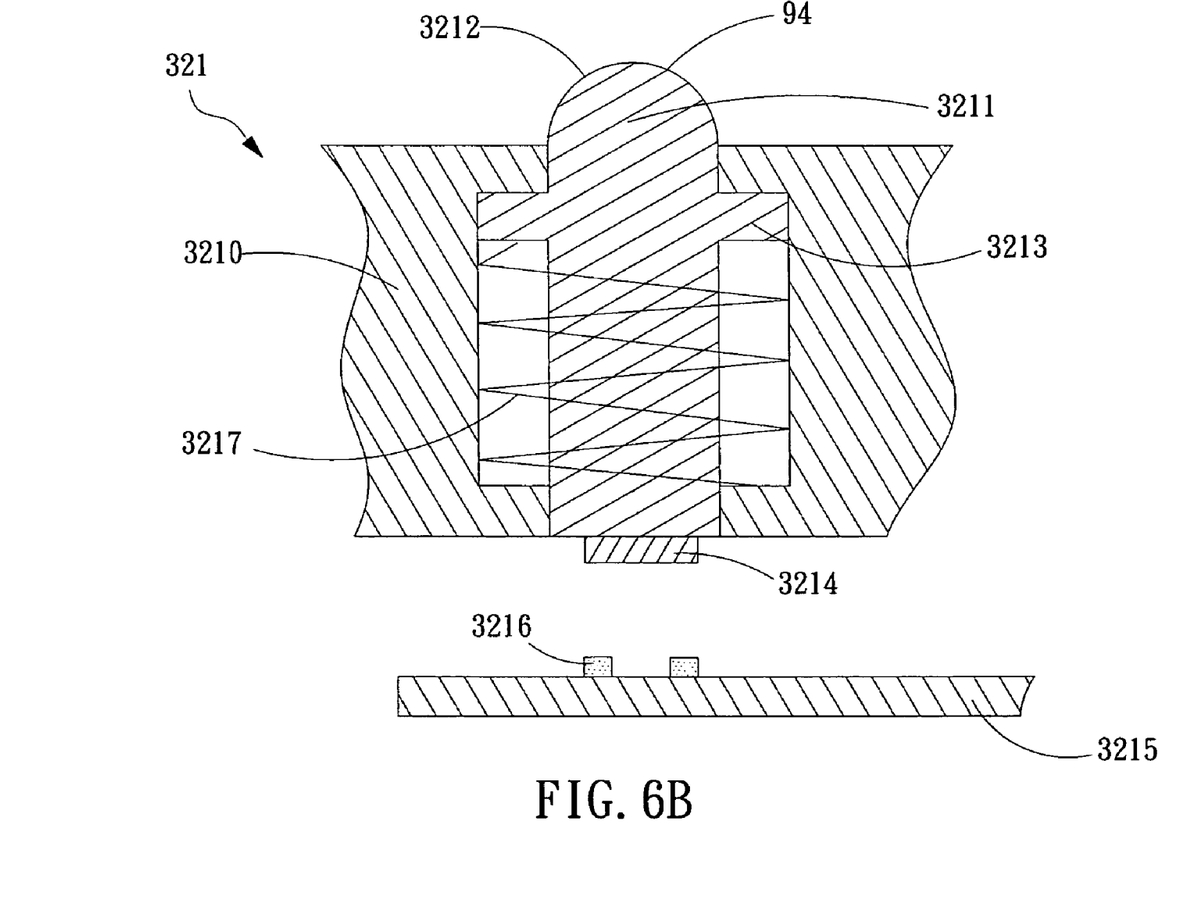

Please refer to FIG. 6A and FIG. 6B, which are schematic diagrams showing operations of a switch mechanism used in an interactive pointing device according to an exemplary embodiment of the invention. The switch mechanism 321, being received inside an accommodation space 3218 of a housing 3210, is comprised of a contact 3211, an elastic element 3217 and a substrate 3215. The contact 3211 is received inside the accommodation space 3218 and is configured with a contact surface 3212 at the top thereof. In this embodiment, the contact surface 3212 is described by an arc, but is not limited thereby. Moreover, there is a bulge 3213 formed at a side of the contact 3211 for guiding the contact 3211 to slide inside the accommodation space 3218. In addition, the contact 3211 is further configured with an electrical connector 3214 at the bottom thereof, which is made of a material of conductivity. The elastic element 3217, being arranged to abut against the bulge 3213 by an end thereof and abut against a side of the housing 3210 by another end thereof, is used for exerting a resilience force on the contact 3211 and thus enabling the contact 3211 to move in reciprocation between a first position 93 and a second position 94. In this embodiment, the elastic element 3217 is a spring. The substrate 3215, arranged at a side of the contact 3211 and coupled to the micro processing unit 33, is used for enabling the substrate 3215 to connect to the electrical joints 3216 when the contact 3211 reaches the first position so that is electrically connected to the electrical connector 3214.

When the base 3200 is positioned at a position of 0-degree, as that shown in FIG. 5A, a side of the base 3200 will press on the contact surface 3212 of the contact 3211 for forcing the contact to move downwardly and thus compress the elastic element 3217, thereby, enabling the electrical connector 3214 disposed at the bottom of the contact 3211 to connect electrically with the electrical joint 3216 of the substrate 3215 for transmitting the turning signal to the micro processing unit 33. On the other hand, when the base 3200 is positioned at a position of 90-degree, as that shown in FIG. 5B, the base 3200 is no longer in contact with the contact 3211 so that the resilience force of the elastic element 3217 will force the contact 3211 to reach the second position and thus the electrical joints 3216 of the substrate 3215 are not conducted and therefore the micro processing unit is informed that the orientation of gyroscope device 31 had been changed.

When the turning mechanism 32 is positioned as that shown in FIG. 5A, the interactive pointing device 3 enters the pointing mode. When the interactive pointing device 3 is operating under the pointing mode, the micro processing unit 33 uses signals detected by the gyroscope device 31 to compensate accelerations caused by the rotation movement of the interactive pointing device 3. When the turning mechanism 32 is positioned as that shown in FIG. 5B, the interactive pointing device 3 enters the game control mode. When the interactive pointing device is operating under the game control mode while operating in star-eighty-shaped motion control, the micro processing unit 33 uses the rotating signal and the accelerating signal, transmitted from an A/D converter, to perform an calculation of action evaluation algorithm with respect to the characteristic values captured in the rotating signal and the accelerating signal for improving action evaluation precision comparing with an action evaluation based simply upon the accelerating signal of the accelerometer module 30.

To sum up, the present invention provides an interactive pointing device capable of responding to requirements of an application to dynamically changing the sensing axis of a gyroscope device configured therein, that it is an interactive pointing device integrating a conventional pointing device and interactive game control interface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An interactive pointing device, comprising:
    an accelerometer module, for generating at least one axis of accelerating signal;
    a gyroscope device, for sensing at least one axis of rotation movement of the interactive pointing device and generating a corresponding rotating signal;
    a turning mechanism, coupled to the gyroscope device for adjusting the orientation of the gyroscope device and generating a turning signal according to the orientation adjustment, comprises:
        a turning unit, capable of performing a rotation movement for adjusting a sensing axis of the gyroscope device, and
        a switch mechanism, capable of being activated by the rotation movement of the turning unit and being trigged to generate the turning signal as soon as the activated switch mechanism reaches a specific position;
    a micro processing unit, coupled to the accelerometer module, the turning mechanism and the gyroscope device for processing the at least one axis of accelerating signal, the turning signal and the rotating signal so as to interact with an electronic device accordingly; wherein the micro processing unit is able to use the rotating signal to compensate the accelerating signal and assist an action evaluation process of the interactive pointing device operating under different operation modes;
    a base, for carrying the gyroscope device; and
    a pivotal shaft, passing through the base for enabling the base to rotate about the pivotal shaft;
    wherein the switch mechanism further comprises:
        a contact, having an electrical connector disposed at an end thereof;
        an elastic element, being arranged to abut against an end of the contact for exerting a resilience force thereon and thus enabling the contact to move in reciprocation between a first position and a second position; and
        a substrate, arranged at a side of the contact for enabling the substrate to connect to the electrical connector when the contact reaches the first position.

2. The interactive pointing device of claim 1, wherein the substrate has at least an electrical joint formed thereon.

3. The interactive pointing device of claim 1, wherein the outer rim of the contact is configured with at least a bulge for guiding the contact to slide.

4. The interactive pointing device of claim 1, wherein the elastic element is a spring.

5. The interactive pointing device of claim 1, wherein the accelerometer module is a tri-axis accelerometer module.

6. The interactive pointing device of claim 1, wherein the accelerometer module further comprises three accelerometers.

7. The interactive pointing device of claim 1, wherein the turning signal is used for controlling the interactive pointing device to enter an operation mode selected from the group consisting of a pointing mode and a game control mode.

8. The interactive pointing device of claim 7, wherein when the interactive pointing device is operating under the pointing mode, the micro processing unit uses a centripetal acceleration detected by the gyroscope device with respect to its sensing axis to compensate a centripetal acceleration value caused by the rotation movement of the interactive pointing device.

9. The interactive pointing device of claim 7, wherein when the interactive pointing device is operating under the game control mode, the micro processing unit uses rotation status of the interactive pointing device detected by the gyroscope device with respect to its sensing axis to perform an calculation of action evaluation algorithm for improving action evaluation precision comparing with an action evaluation.

10. The interactive pointing device of claim 1, wherein the electronic device is a device selected from the group consisting of a computer, and an interactive multimedia apparatus.

* * * * *